Patented May 22, 1934

1,959,945

UNITED STATES PATENT OFFICE 1,959,945

PROCESS FOR SEPARATING FINE PARTICLES FROM GASES

Reginald G. Bowman, Gary, Ind.

No Drawing. Application May 19, 1932,
Serial No. 612,375

4 Claims. (Cl. 183—121)

This invention relates to improvements in the art of cleaning and purifying gases by the removal therefrom of solid and liquid material, and more particularly to those processes in which the gas to be cleaned is subjected to washing or scrubbing with water or other cleansing agents.

In the removal of dust and fume from gases by various types of scrubbers, washers and filters, two types of dust or fume particles are usually encountered. One of these can be easily wetted by water, while the other resists wetting and passes unchanged through showers and even through complete immersion.

For purposes of comparison the former may be called "dust" and the latter "fume".

"Dust" includes ash, fuel dust, rock or ore dust and other relatively coarse material. These substances are easily wetted by water and removed by any one of a number of devices now in use, and well known to the art, in which the gas is brought into intimate contact with showers or sprays of water, is forced to bubble through a body of water or to pass over a wetted surface of large area.

"Fume" includes soot, oil vapor, fly ash, etc., in which the particles are relatively much finer than dust. These particles will repel water and will pass unaffected through the devices mentioned. It is the efficiency of a device in the collection of this small, elusive fraction of the total that determines its value.

The attraction or repulsion of water by the particle is an effect due to differences of surface tension. Fume particles which are not wetted and repel water are easily wetted by certain oils having a lower surface tension than water, and such particles will adhere to an oily surface. This has been made use of in certain types of dust filters and collectors known to the art in which the gas is passed through screens or honeycomb passages, the surfaces of which are covered with a film of oil.

Devices of this class have the disadvantage that the particle in being caught adheres to a fixed surface and must be removed; this must be done at frequent intervals else the surface becomes fouled and loses its efficiency. The oil is a relatively expensive material and must be used very sparingly, or circulated, cleaned and reused. In either case the collected material must be handled by separate mechanical equipment. An additional disadvantage is that the oil collecting medium is not adapted for use in hot or very wet gases.

Devices using water have the great advantage that the water may be used for cooling the gas, collecting the dust and as an exceedingly flexible and cheaply handled mechanical vehicle for transporting and disposing of the collected material with the waste water. Water is a relatively cheap medium and may be used in abundance and discarded.

The object of this invention is to combine the actions and advantages of both types of collecting processes by using, as a collecting medium, water having upon its surface a film of oil, or other selective collecting agent of a lower surface tension than water.

Since in this process the film of oil is confined to the surface of the water, "dust" particles will be wetted in the usual way in bubbling the gas through the water; the "fume" particles will be collected by contact with the oil film. In shower and spray devices using this process the oil introduced with the water will form a thin film upon the surface of each drop; the drop will then have the same action in collecting fume particles as a drop of oil.

The quantity of oil required to film the surface of a large volume of water is extremely small and the oil can be discarded with the waste water, involving no expense of recovery or re-use of oil.

The action and convenience of the water in cooling the gas and in serving as a carrier for removing and disposing of the collected material is not interfered with.

The physical phenomena involved in this process are similar to those in the flotation process of ore concentration, and the types of oils and collecting agents suited for flotation use will give the best results. A thick layer of oily froth or suds carried upon the surface of a body of water acts as a very efficient fume filter or collector for any particle of fume carried by a gas bubbled upward through the water. Such a froth is easily produced by the addition of very small amounts of commercial frothing agents used in the flotation process of ore concentration. The necessary agitation may be supplied by the introduction of the gas to be cleaned, or by mechanical agitators, as in various types of flotation machines. The froth when fouled by collected fume particles may be skimmed off and run to waste.

To apply the process to any form of collector using water, all that is required is to introduce a small amount of oil with the water. No special equipment is required for introducing the oil. A standard oil cup or lubricator may be used for feeding a small amount of oil into the water pipe supplying the entire apparatus, or any part of it. If the collector is supplied with water by a centrifugal pump, it is well to introduce the oil into the pump intake; the agitation produced by the pump impeller is sufficient to distribute the oil in an emulsified condition through the water supplied to the collector.

While my invention contemplates the general application to the mechanical washing of gases containing solid and liquid particles of a selective and efficient collecting agent in the form of a surface film borne upon the surface of water and presented to the gas in any mechanical manner desired, I have established by practice that it is particularly effective when applied to those devices in which the mixture of water and the selective collecting agent, (preferably oil,) are sprayed or showered upon a perforated or interstitial surface, and the gas containing the particles is flowed against this surface. The water in flowing over the interstitial surface presents a maximum amount of its surface to the gas for cooling the gas and collecting the particles which can be wetted by water, while the oil, which resides entirely upon the surface of the water, is for the same reason presented at its maximum efficiency to the gas for the collection of the particles which resist water but are wetted by oil.

While I have described my invention more particularly with reference to this mechanical application, it will be understood that this is for the purpose of illustration only, and is not intended to limit it to any single type of apparatus.

I claim:—

1. The method of separating fine particles from gases which consists in spraying upon an interstitial member a mixture of water and a water immiscible oil and flowing the gases from which the particles are to be removed against said interstitial surface, whereby a froth is formed upon the said surface, and said fine particles are removed by said froth.

2. A process for removing fine particles from gases by treating the gases with a washing liquid, characterized by adding to the washing liquid an oil substantially immiscible therewith and adapted to form a film over the surface of said liquid, agitating said mixture of oil and liquid to form a froth, and flowing said gases from which the particles are to be removed against said froth.

3. The method as set forth in claim 2, further characterized by the fact that the oil is of lower specific gravity than the washing liquid.

4. A process for removing fine particles from gases by treating the gases with a washing liquid, characterized by adding to the washing liquid an oil substantially immiscible therewith, and adapted to form a froth over the surface of said liquid, introducing the gas to be cleaned below the surface of said liquid to agitate the liquid and produce a froth upon its surface, and flowing said gases against said froth and skimming the froth from the surface of said liquid.

REGINALD G. BOWMAN.